July 29, 1958     A. G. SCHILBERG     2,844,864
METHOD OF MAKING I-BEAMS FOR VEHICLE FRAMES
Filed Jan. 10, 1955
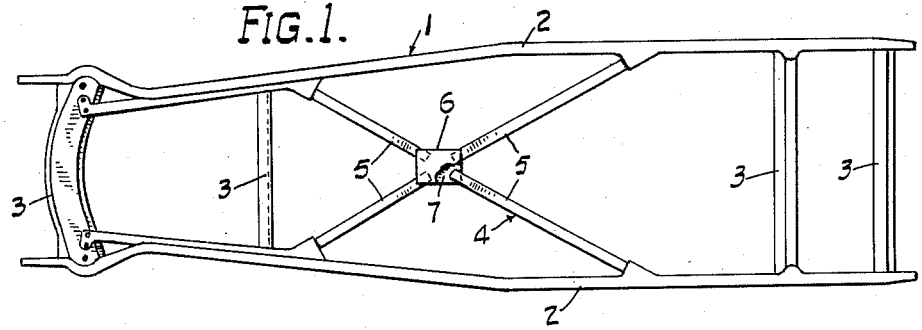
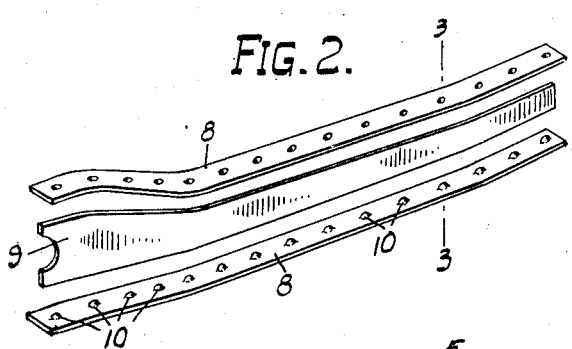
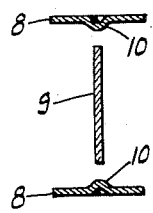
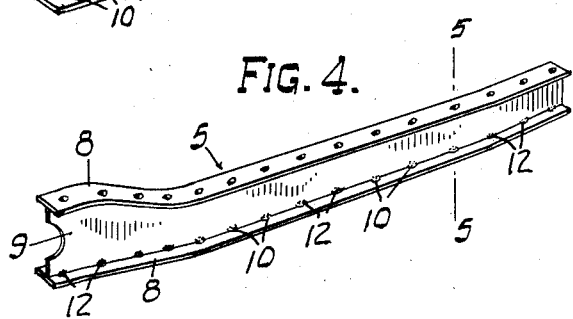
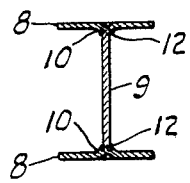
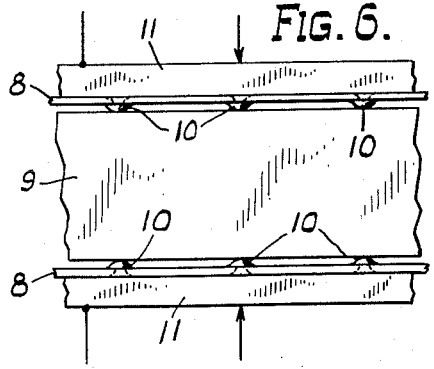
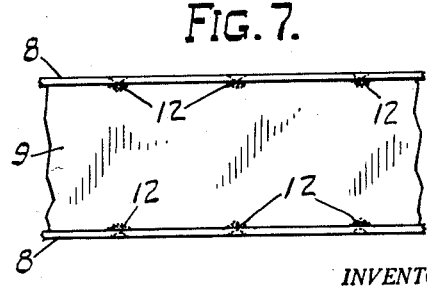
INVENTOR.
Arnold G. Schilberg
BY Andrus & Scales
Attorneys United States Patent Office 2,844,864
Patented July 29, 1958

2,844,864

METHOD OF MAKING I-BEAMS FOR VEHICLE FRAMES

Arnold G. Schilberg, Milwaukee, Wis., assignor to A. O. Smith Corporation, Milwaukee, Wis., a corporation of New York Application January 10, 1955, Serial No. 480,783

1 Claim. (Cl. 29—155)

This invention relates to a method of making vehicle frames, and more particularly to automobile frames having an X-member made up of I-beams.

According to the invention, an I-beam for use in an X-member of an automobile frame is fabricated from flange and web components blanked from flat stock of desired thickness. The flange components are bent to accommodate a given web contour and are provided inwardly, before assembly of the X-member, with a plurality of spaced embossments or projections along their central longitudinal axes.

The embossed flange components with the web therebetween are placed in a suitable fixture with the longitudinal edges of the web in contact with the line of projections. A welding current is then applied to the respective components simultaneously with the application of pressure to the flanges and web to projection weld them together.

The above described method produces an I-beam equally as rigid as those formed by arc welding or other methods, and substantially reduces the cost of the final product.

The accompanying drawing illustrates the best mode presently contemplated by the inventor for carrying out the invention.

In the drawing:

Figure 1 is a plan view of a vehicle frame showing an X-member constructed in accordance with the invention;

Fig. 2 is a perspective view of the flange and web components of the X-member just prior to assembly;

Fig. 3 is a transverse section of a portion of the X-member, taken on line 3—3 of Fig. 2;

Figure 4 is a perspective view of an I-beam after welding;

Fig. 5 is a transverse section of the completed I-beam taken on line 5—5 of Fig. 4;

Fig. 6 is a fragmentary side elevation of the I-beam just prior to welding and showing the pressure applying means; and Fig. 7 is a fragmentary side elevation of the I-beam after welding.

As shown in the drawing, the invention is embodied in a vehicle frame 1 having a pair of spaced parallel side rails 2 connected by suitable cross members 3. An X-member 4 is disposed centrally of the frame and comprises four inwardly converging I-beams 5 joined at the center by a pair of vertically spaced upper and lower plates 6 and 7, respectively. The outer ends of I-beams 5 are secured to side rails 2 in any suitable way, such as by welding.

Each I-beam 5 comprises a pair of vertically spaced flanges 8 which are secured to a suitable flat web member 9 along their central longitudinal axes.

In the manufacture of each X-member 4, flange members 8 and web 9 are first formed from flat plate stock of the desired composition and thickness. Since webs 9 are of varying longitudinal edge contour, flange members 8 are formed so that they conform thereto upon assembly.

Subsequent to the forming operation a number of spaced projections or nibs 10 are punched or otherwise embossed along the longitudinal center line or axis of each flange member 8. Projections 10 are so embossed as to be integrally raised on the inner surface of flanges 8 where contact with web member 9 will be made. Although projections 10 are shown as being round, it may be advantageous to make them elongated in either a transverse or longitudinal direction.

To assemble each I-beam 5, upper and lower flanges 8 are spaced apart with projections 10 in facing relationship and the web 9 is inserted therebetween so that the longitudinal edges of web 9 are in contact with the row of spaced projections 10 on both flanges. Web 9 contacts the outer extremities of projections 10 and is spaced from the inner surface of flanges 8 by an amount equal to the extent of the projections. Flanges 8 are then connected to a suitable electric circuit so that when the circuit is energized a welding current will flow from one flange, through the projections and into and through web 9, and hence through the second set of projections and into the other flange and back to the source of current.

The above described method of fabrication utilizes a series type welding circuit. It is equally possible to use a parallel circuit wherein current is passed through the flanges and only adjacent the edges of the web. This latter method utilizes less current, for it does not pass through the structure from one flange to the other.

Fig. 6 shows spaced upper and lower press members 11 which are used to apply pressure normal to the flanges and to the webs during welding. If desired, members 11 may be utilized as electrodes to supply the welding current.

The heat of resistance caused by the current flowing through projections 10 will soften them and upon the application of vertical mashing pressure as by press members 11 the flanges 8 and web 9 will be welded together at welds 12 with the edges of the web flush with the inner surfaces of the flanges after the welding is completed, as shown in Figs. 5 and 7.

Although the construction of each of the I-beams is the same, their dimensions may vary in any one X-member. Figure 1 shows rearwardly extending I-beams which are longer than those extending forwardly.

The above described method of manufacturing I-beams for X-members of vehicle frames provides a means whereby welding of all the components is effected simultaneously, resulting in a substantial saving of manufacturing time. Costly welding apparatus is dispensed with. No metal need be cut away from or added to any of the parts between the original blanking operation and final assembly. Projections 10 do not require any extra material in flanges 8 nor in webs 9.

Various modes of carrying out the invention are contemplated as being within the scope of the following claim particularly pointing out and distinctly claiming the subject matter which is regarded as the invention.

I claim:

A method of making an I-beam for an X-member of an automobile frame, comprising forming a pair of flanges from suitable plate metal stock, forming a flat web member of varying longitudinal edge contour from suitable plate stock, bending said flanges so that they will conform to the edge contour of said web upon assembly, embossing a row of integral longitudinally spaced projections along the longitudinal axis of each flange, placing the web between the flanges so that the upper and lower edges of said web are in contact with the extremities of the projections with the edges of said web being thereby spaced slightly from the inner surfaces of said flanges, passing a welding current through the structure from one flange to the other, the current passing through the projections and softening them due to the resistance heating action, and simultaneously applying pressure normal to and along the outer surface of the flanges to weld the flanges and web edges together into an integral unit, the welding of the web to both flanges being accomplished simultaneously.

References Cited in the file of this patent

UNITED STATES PATENTS

| | | |
|---|---|---|
| 1,557,573 | Fassler | Oct. 20, 1925 |
| 2,108,795 | Budd | Feb. 22, 1938 |
| 2,172,806 | Probeck | Sept. 12, 1939 |
| 2,467,516 | Almdale | Apr. 19, 1949 |